(12) United States Patent
Kopfer

(10) Patent No.: US 7,036,927 B2
(45) Date of Patent: May 2, 2006

(54) FACE FOAM FREE PROTECTIVE EYEWEAR WITH INNER LINER AND VENT

(76) Inventor: Rudolph J. Kopfer, 2 Harbor Point Dr., Apartment 502, Mill Valley, CA (US) 94941

( * ) Notice: Subject to any disclaimer, the term of this patent is extended or adjusted under 35 U.S.C. 154(b) by 19 days.

(21) Appl. No.: 10/822,065

(22) Filed: Apr. 8, 2004

(65) Prior Publication Data

US 2005/0225715 A1 Oct. 13, 2005

(51) Int. Cl.
 *G02C 11/08* (2006.01)
(52) U.S. Cl. .............................. 351/62; 2/437
(58) Field of Classification Search ................ 351/62, 351/111, 120, 118, 119; 2/12, 435
See application file for complete search history.

(56) References Cited

U.S. PATENT DOCUMENTS

| | | | |
|---|---|---|---|
| RE12,924 E | 3/1909 | Cover | 2/440 |
| 1,031,859 A | 7/1912 | Malcom | 2/439 |
| 1,433,676 A | 10/1922 | Cover | 2/440 |
| 1,478,818 A | 12/1923 | Cover | 2/440 |
| 1,562,350 A | 11/1925 | Luckey | 52/172 |
| 1,669,229 A | 5/1928 | Cook | 2/440 |
| 1,677,747 A | 7/1928 | Cook | 2/440 |
| 1,720,814 A | 7/1929 | Baker | 2/440 |
| 1,741,427 A | 12/1929 | Meyrowitz | 2/440 |
| 1,754,694 A | 4/1930 | Neuwirth | 2/440 |
| 1,846,679 A | 2/1932 | Fischer | 2/440 |
| 1,853,872 A | 4/1932 | Meyrowitz | 2/440 |
| 1,936,746 A | 11/1933 | Baker | 2/440 |
| 1,989,876 A | 2/1935 | Meyrowitz | 2/444 |
| 2,002,543 A | 5/1935 | Meyrowitz | 2/440 |
| 2,007,186 A | 7/1935 | Farrell | 2/440 |
| 2,026,435 A | 12/1935 | Ratti | 2/440 |
| 2,321,159 A | 6/1943 | Ryan | 2/441 |
| 2,364,584 A | 12/1944 | Malcom | 2/440 |
| 2,387,821 A | 10/1945 | Baratelli et al. | 2/447 |
| 2,466,048 A | 4/1949 | Kimball | 502/82 |
| 2,526,181 A | 10/1950 | Wilen | 2/440 |
| 2,608,687 A | 9/1952 | Ellis | 2/445 |
| 2,846,684 A | 8/1958 | Hill | 2/441 |
| 3,377,626 A | 4/1968 | Smith | 2/435 |
| 3,419,909 A | 1/1969 | Spain | 2/174 |
| 3,556,644 A | 1/1971 | Stahl | 351/118 |
| 3,591,864 A | 7/1971 | Allsop | 2/436 |
| 3,806,558 A | 4/1974 | Fischer | 525/198 |
| 3,945,044 A * | 3/1976 | McGee et al. | 2/436 |
| 4,245,630 A | 1/1981 | Lloyd et al. | 604/358 |
| 4,264,987 A | 5/1981 | Runckel | 2/428 |
| 4,405,212 A | 9/1983 | Cooper | 351/43 |
| 4,414,693 A | 11/1983 | Brody | 2/435 |
| 4,468,819 A | 9/1984 | Ohno | 2/430 |
| 4,544,245 A | 10/1985 | Stansbury, Jr. | 351/120 |
| 4,614,183 A | 9/1986 | McCracken et al. | 128/846 |
| 4,654,899 A | 4/1987 | Harris | 2/436 |
| 4,707,863 A | 11/1987 | McNeal | 2/436 |

(Continued)

FOREIGN PATENT DOCUMENTS

FR 2.130.907 11/1972

(Continued)

*Primary Examiner*—Hung Xuan Dang
(74) *Attorney, Agent, or Firm*—Medlen & Carroll LLP

(57) ABSTRACT

The present invention provides protective eyewear for indoor and outdoor activities. In particular the present invention provides eyewear with an inner liner that protects the wearer's eyes from wind, dust, moisture, glare, allergens, and damaging ultraviolet radiation, while preventing lens fogging with a direct or indirect venting system.

34 Claims, 6 Drawing Sheets

U.S. PATENT DOCUMENTS

| | | | |
|---|---|---|---|
| D293,504 S | 1/1988 | Specht et al. | D16/107 |
| D295,533 S | 5/1988 | Wichers | D16/102 |
| 4,741,611 A | 5/1988 | Burns | 351/44 |
| 4,781,956 A | 11/1988 | Zimmermann et al. | 428/43 |
| 4,785,481 A | 11/1988 | Palmer et al. | 2/436 |
| 4,792,221 A | 12/1988 | Parks et al. | 351/120 |
| 4,837,062 A | 6/1989 | Dunshee et al. | 428/41.3 |
| 4,877,320 A | 10/1989 | Holden | 351/44 |
| 4,955,708 A | 9/1990 | Kahaney | 351/44 |
| 5,018,223 A | 5/1991 | Dawson et al. | 2/436 |
| 5,019,071 A | 5/1991 | Bany et al. | 604/389 |
| 5,191,364 A | 3/1993 | Kopfer | 351/62 |
| D339,596 S | 9/1993 | Kopfer | D16/300 |
| 5,243,711 A | 9/1993 | Graham | 2/439 |
| RE34,512 E | 1/1994 | Dowdy et al. | 128/853 |
| 5,282,791 A | 2/1994 | Lipton et al. | 604/180 |
| 5,300,963 A | 4/1994 | Tanaka | 351/44 |
| 5,339,119 A | 8/1994 | Gardner | 351/44 |
| 5,388,269 A | 2/1995 | Griffin | 2/13 |
| 5,428,411 A | 6/1995 | Kopfer | 351/62 |
| 5,520,629 A | 5/1996 | Heinecke et al. | 602/57 |
| 5,548,351 A | 8/1996 | Hirschman et al. | 351/47 |
| 5,611,356 A | 3/1997 | Rothrum | 128/844 |
| 5,614,963 A | 3/1997 | Parker | 351/47 |
| 5,619,750 A * | 4/1997 | Allewalt | 2/13 |
| 5,711,035 A | 1/1998 | Haslbeck | 2/436 |
| 5,802,622 A | 9/1998 | Baharad et al. | 2/434 |
| D402,681 S | 12/1998 | MacWilliamson | D16/327 |
| 6,026,518 A | 2/2000 | Brown | 2/439 |
| 6,050,684 A | 4/2000 | Mage | 351/62 |
| 6,062,688 A | 5/2000 | Vinas | 351/47 |
| 6,076,196 A | 6/2000 | Masumoto | 2/436 |
| D428,913 S | 8/2000 | Kopfer | D16/326 |
| 6,233,342 B1 | 5/2001 | Fernandez | 381/62 |
| 6,364,479 B1 * | 4/2002 | Wu | 351/120 |
| 6,550,914 B1 | 4/2003 | Kopfer | 351/62 |

FOREIGN PATENT DOCUMENTS

| | | |
|---|---|---|
| GB | 127410 | 5/1919 |
| GB | 364970 | 1/1932 |
| JP | 56133716 | 10/1981 |
| JP | 4075019 | 3/1992 |

* cited by examiner

FACE FOAM FREE PROTECTIVE EYEWEAR WITH INNER LINER AND VENT

FIELD OF THE INVENTION

The present invention provides protective eyewear for indoor and outdoor activities. In particular the present invention provides eyewear with a flexible inner liner that protects the wearer's eyes from wind, dust, moisture, glare, allergens, and damaging ultraviolet radiation, while preventing lens fogging with a direct or indirect venting system.

BACKGROUND OF THE INVENTION

Many individuals have sensitive eyes that may become aggravated by various indoor and outdoor activities. Contact lens wearers are one example of this population, which can find even a short hike in the park difficult, particularly on dry, windy days when their lenses are more prone to becoming displaced. In addition, millions of Americans suffer from dry eye syndrome, a condition characterized by a decline in the quality or quantity of tears bathing the eye, resulting in constant eye irritation. Exposure to wind, sunlight and allergens can exacerbate dry eye syndrome leading to ulceration of the cornea, and eventual loss of vision.

Protective eyewear of the prior art for use in sports and the like, typically includes an inner liner made of foam configured to fit between a safety glass frame and a wearer's face. Eyewear having a foam component contacting the wearer's face, though suitable for activities such as skiing and motorcycle riding, is found to be objectionable for everyday use. Specifically, wearers frequently find eyewear with a foam liner to be overly confining. Moreover, foam liners quickly become saturated with sweat during use in sports, and wear out over time with minimal to frequent usage.

Thus, there is a need in the art for eyewear that provides more protection than a typical pair of glasses and perhaps less than a pair of goggles. Specifically, there is a need for eyewear that is suitable for blocking wind, dust, moisture, glare, allergens, and harmful ultraviolet radiation, which is also fashionable, comfortable, durable and fog-resistant.

SUMMARY OF THE INVENTION

The present invention provides protective eyewear for indoor and outdoor activities. In particular the present invention provides eyewear with an inner liner that protects the wearer's eyes and skin from wind, dust, moisture, glare, allergens, and damaging ultraviolet radiation, while preventing lens fogging with a direct or indirect venting system.

Specifically, the present invention provides eyewear inserts for protecting a wearer's eyes, comprising: a flexible or semi-rigid anatomically-molded inner liner comprising a front surface that closely contacts an inner surface of an eyewear frame or lens, and a back surface that substantially contacts skin around a wearers eyes, so that one or more deadspaces are created between the eyewear frame or lens and the wearer's eyes, by substantially filling the gap between the eyewear frame or the lens and the skin around a wearer's eyes, wherein the liner does not comprise face foam and wherein the inner liner is sized for attachment to an inner surface of an eyewear frame or co-molded as part of an eyewear frame. In some embodiments, the insert comprises a vent that channels airflow through the deadspaces. In a subset of these embodiments, the vent comprises a filter-like material. In some preferred embodiments, the inner liner is made of a durable, flexible material for accommodating a plurality of face sizes, while in other embodiments, the inner liner is made of a durable, semi-rigid material for accommodating a single face size. In some embodiments, the insert is retrofitted to an existing eyewear. The present invention also provides eyewear inserts, wherein the insert is releasably attached to an eyewear frame by a means selected from but not limited to screws, Velcro, clips, and temple slip, while in other embodiments, the insert is permanently attached to an eyewear frame. In some embodiments, the insert is configured to fit within an eyewear frame comprising side windows. In some preferred embodiments, the insert is configured to fit within an eyewear frame comprising prescription lenses of any thickness. In additional preferred embodiments, the vent is an indirect vent comprising a plurality of upper baffled vents and a plurality of lower baffled vents. In other embodiments, the vent is a direct vent comprising a plurality of upper vents and a plurality of lower vents. In some embodiments, the baffled vents of the insert comprise staggered vent grooves for forcing incoming air to make a ninety-degree turn before entering the deadspaces. Also provided are eyewear inserts, wherein the vent comprises venturi tunnels. In some embodiments, the back surface of the insert comprises a serrated pattern for reducing sweating and discomfort. In some embodiments, the front surface of the insert comprises a concave groove permitting air to pass between the deadspaces. In some preferred embodiments, the insert is made of thermoplastic rubber.

Moreover, the present invention provides protective eyewear comprising an eyewear frame having temple bars or a strap, and an eyewear insert for protecting a wearer's eyes, wherein the eyewear insert comprises: a flexible or semi-rigid anatomically-molded inner liner comprising a front surface that closely contacts an inner surface of an eyewear frame or lens, and a back surface that substantially contacts skin around a wearers eyes, so that one or more deadspaces are created between the eyewear frame or lens and the wearer's eyes, by substantially filling the gap between the eyewear frame or the lens and the skin around a wearer's eyes, wherein the liner does not comprise face foam and wherein the inner liner is sized for attachment to an inner surface of an eyewear frame or co-molded as part of an eyewear frame. In some preferred embodiments, the eyewear frame and the insert are made of a durable, flexible material suitable for accommodating a plurality of face sizes by flattening the eyewear frame and insert, upon spreading the temple bars. In some embodiments, the eyewear frame is made of a plastic material. In a subset of these embodiments, the plastic material is GRILAMID. The present invention also provides embodiments, wherein the eyewear frame comprises a vent that channels airflow through the deadspaces. In some embodiments, the eyewear frame comprises a front surface and a back surface, and wherein the back surface of the eyewear frame comprises a concave groove permitting air to pass between the deadspaces. In some embodiments, the eyewear frame comprises: a single aperture suitable for use with a single shield-like lens; two apertures suitable for use with two lenses; or four apertures suitable for use with two main lenses and two side lenses. In some preferred embodiments, the temple bars of the eyewear frame comprise a means for adjusting temple length. In some particularly preferred embodiments, the protective eyewear comprises a means for panascopic angle adjustment located between the temple bars and the eyewear frame, within the temple bars or within the eyewear frame.

Additionally, the present invention provides protective eyewear comprising at least one lens, an eyewear frame having temple bars or a strap, and an eyewear insert for protecting a wearer's eyes, comprising: a flexible or semi-rigid anatomically-molded inner liner comprising a front surface that closely contacts an inner surface of an eyewear frame or lens, and a back surface that substantially contacts skin around a wearers eyes, so that one or more deadspaces are created between the eyewear frame or lens and the wearer's eyes, by substantially filling the gap between the eyewear frame or the lens and the skin around a wearer's eyes, wherein the liner does not comprise face foam and wherein the inner liner is sized for attachment to an inner surface of an eyewear frame or co-molded as part of an eyewear frame. In some embodiments, the at least one lens is polarized. In some preferred embodiments, the at least one lens provides at least 95% protection from harmful UVA and UVB rays, and/or filters at least 95% of the harmful high-energy visible light. In some embodiments, the at least one lens transmits from 12% to 98% visible light. The present invention provides protective eyewear, wherein the at least one lens is made of a plastic material. In a subset of these embodiments, the plastic material is selected from the group consisting of CR39, polycarbonate, polyurethane, and MELANITE. In other embodiments, the at least one lens is made of a glass. In some preferred embodiments, the at least one lens is a prescription lens, is a double-paned lens, comprises an antifog means, and/or is interchangeable. In some embodiments, the eyewear frame is substantially hidden behind the at least one lens.

DEFINITIONS

Figure 1:
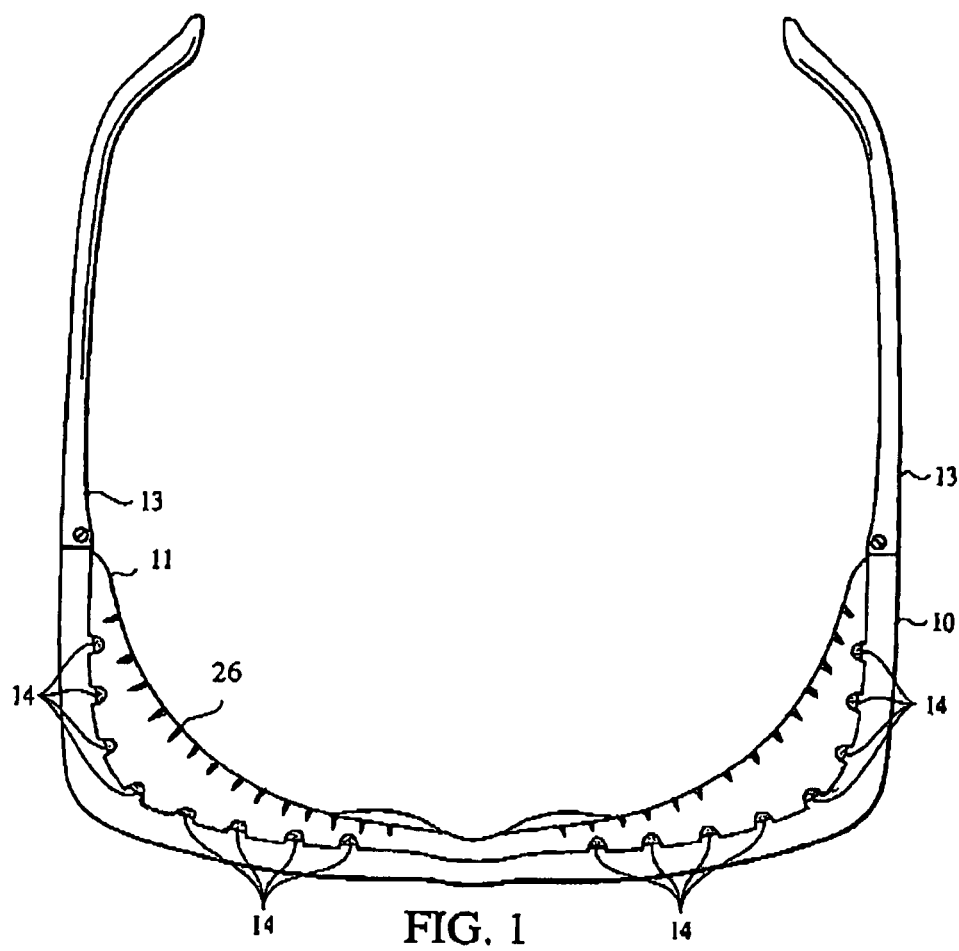
FIG. 1 is a top view of an eyewear frame and an eyewear insert of the present invention.

As used herein, the term "face foam" refers to a lightweight material in cellular form, made by introducing gas bubbles during manufacture, which contacts a wearer's face when used as an eyewear insert or back surface thereof.

As used herein, the terms "thermoplastic rubber" and "thermoplastic elastomer" refer to a polymer blend or compound, which above its melt temperature, exhibits a thermoplastic character that enables it to be shaped into a fabricated article and which, within its design temperature range, possesses elastomeric behavior without cross-linking during fabrication. This process is reversible and the products can be reprocessed and remolded.

As used herein, the terms "TPR" and "thermo plastic rubber" refer to a product made of a partially cured thermoplastic blend of monolefin copolymer rubber and polyolefin plastic disclosed in U.S. Pat. No. 3,806,558, herein incorporated by reference.

As used herein, the term "thermoset" refers to a material that has been cured using thermal curing (generally heating above 200 degrees celsius). Thermoset polymers are plastics that have been generated using heat to crosslink the molecular chains. This in turn means the process is irreversible.

As used herein, the term "nylon" refers to a family of synthetic plastic materials. Chemically, nylon is a condensation polymer made of repeating units with amide linkages between them, hence it is frequently referred to as a polyamide.

As used herein, the terms "TR90" and "GRILAMID" refer to a resilient frame material that is produced as a nylon 12 polymer by EMS American Grilon.

For the purpose of frame and insert fabrication, both thermoplastic and thermoset materials are suitable, although the present invention is not limited to these materials.

As used herein, the term "plastic" refers to synthetic or semi-synthetic organic condensation or polymerization products that can be molded or extruded into objects, films or fibers. Their name is derived from the fact that in their semi-liquid state they are malleable.

As used herein, the term "CR39" refers to a heat-hardening (thermo-setting) plastic made by polymerization of the dietilenglycol bis allylcarbonate. Briefly, CR39 lenses are produced, by pouring a liquid polymer into a mold of optically treated glass, yielding ophthalmic lenses with high optical qualities that are relatively scratch-resistant.

As used herein, the term "polycarbonate" refers to a thermoplastic resin. Briefly, polycarbonate lenses are manufactured by pouring the material into metal moulds at high pressures and temperatures. Polycarbonate lenses have excellent anti-impact properties, which make them suitable for sports and industrial uses, although they generally require an anti-scratch treatment.

As used herein, the term "polyurethane" refers to any of various thermoplastic polymers containing the urethane radical.

As used herein, the term "melanin" refers to a pigment found in the skin, hair, and eyes of vertebrate animals, which protects the body from damage by ultraviolet radiation from the sun.

As used herein, the term "MELANITE" refers to lenses containing synthetic melanin. In some embodiments, the present invention comprises MELANITE lenses or lenses with melanin such as those manufactured by Intercast Technologies. In particular, Intercast solubilizes melanin in CR39 to produce transparent sun lenses that spectroscopically reproduce the absorption spectrum of natural melanin. However, the present invention also encompasses lenses comprising melanin and polycarbonate or polyurethane.

For the purpose of lens fabrication, plastic lenses such as those made of CR39, polycarbonate, polyurethane and MELANITE are suitable, although the present invention is not limited to these materials.

As used herein, the term "venturi effect" refers to increases in fluid speed when a fluid is forced past a narrow or restricted area. The increased speed results in a reduction in pressure (e.g., vacuum effect). Similarly, as used herein, the term "venturi tunnel" refers to a direct venting means comprising a restricted area in which a venturi effect is produced.

DESCRIPTION OF INVENTION

Historically, eyewear has included two components, a frame and lenses. Now, with the development of the present invention, a third component has been introduced, an inner liner located conspicuously or inconspicuously between the frame and the wearer's face. The inner liner of the present invention has been designed to substantially fit the orbital anatomical features, thus essentially closing the space between the frame and the face and greatly reducing the devastating effect of peripheral wind, moisture, solar radiation, allergens and dust that cause eyestrain, soreness, discomfort and ocular disease. The present invention benefits sports participants and those with sensitive eyes by providing a durable and comfortable eye shelter, in the form of an anti-fogging inner liner.

A. Inner Liner

The inner liner of the present invention is a contoured anatomically molded insert that is attached to or made part of an eyewear frame, so as to essentially close the space or gap between the face and the eyewear frame. The anatomical-molding of the inner liner or insert makes it possible for the insert to substantially fit the orbital and facial anatomy. When produced as a companion product, the inner liner is attached to the eyewear frame by any suitable means including but not limited to screws, Velcro, glue, clips, and temple slips. In some embodiments, the inner liner is made of a thermoset material. In other embodiments, the inner liner is made of thermo plastic rubber (TPR) with a hardness of about 75A, and does not comprise foam or foam-like components in portions of the insert contacting the wearer's face. This is in contrast to inserts of the prior art, which have traditionally used face foam to compressibly fill the gap between the frame and the face. Importantly, since the insert is made of a flexible material, it fits both a small face in a neutral or relaxed frame position, and a large face when spread by lateral pressure on the temple bars. Thus, the insert of the present invention fits a wide range of face sizes.

The inner liner of the present invention comprises a venting means to prevent fogging and to prevent ingress of harmful ultraviolet radiation, as well as other undesirable elements (e.g., wind, dust, snow, pollen, etc.) that may damage the eye or orbital structure. In some embodiments, the venting means is located between the insert and the frame. Alternatively, in embodiments comprising a co-molded frame and insert, the venting means is located between the front of the frame and the lens. In some embodiments, the venting means is direct, while in preferred embodiments, the venting means is indirect or baffled. The venting means of the present invention comprises a filter-like material that prevents ingress of undesirable elements in some embodiments. Suitable filter-like materials include but are not limited to foam (See, e.g., eyewear disclosed in U.S. Pat. Nos. 5,191,364, 5,428,411, and 6,550,914, herein incorporated by reference in their entirety), porous-cloth and mesh. Morever, to further prevent sweating and moisture build-up, in some embodiments, the inner liner comprises a serrated surface adjacent to the face.

B. Frame

Figure 6:
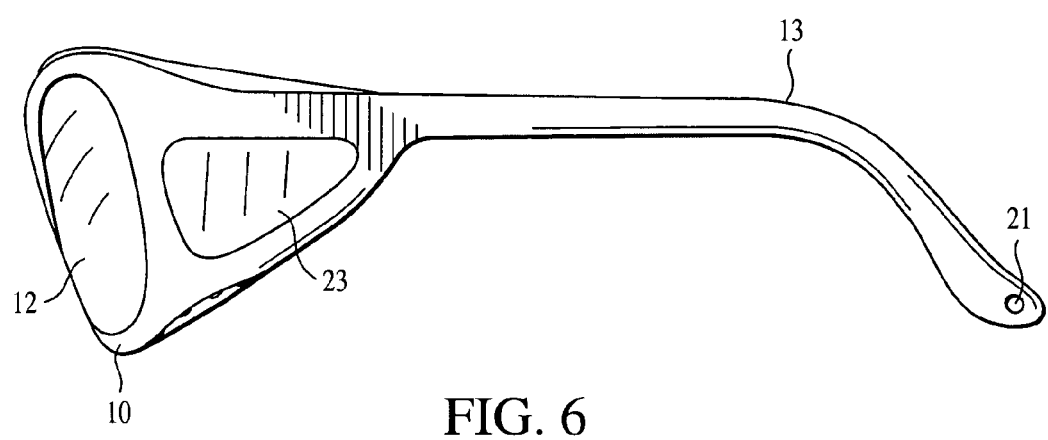
FIG. 6. is a side view of the eyewear frame and eyewear insert of the previous figures, depicting an aperture in the frame for a main lens, as well as an aperture for an optional side lens.

The frame of the present invention is produced from any suitable resilient material. In some preferred embodiments, the frame is made of a nylon polymer such as GRILAMID. As discussed above, the inner liner is either co-molded with a suitable frame or is designed to retrofit a specific existing frame. Typically the frame includes two eye apertures in which lenses are mounted. However, the present invention also encompasses frames with a single aperture or more than two apertures. For instance, as shown in FIG. 6, the invention also provides frames comprising side lenses to provide wearers with substantially unhindered peripheral vision (e.g., at least 140 degrees).

C. Lenses

The lenses of the present invention are made of any suitable material for absorption of ultraviolet light. In some preferred embodiments, the lenses are suitable for absorption of 100% UVB and 100% UVA ultraviolet light, per the American National Standards Institute (ANSI Z80.3). Moreover, preferred lenses filter over 95% of the harmful blue and violet high energy visible light, and pass all ANSI Z87 requirements for traffic signal recognition.

Exemplary polarized lenses include but are not limited to plastic lenses such as CR39 lenses, polycarbonate lenses, polyurethane lenses, and MELANITE lenses. Lens colors include but are not limited to brown, copper, amber, light amber, grey, light silver flash and light blue flash, depending upon the wearer's anticipated usage and desire. For instance, copper lenses are high contrast lenses that allow medium true color transmission (18% VLT) for general and all around use. Grey lenses are medium contrast lenses that allow natural and true color transmission (14% VLT) for general use. Light silver and blue flash lenses are high contrast lenses with a copper base for use in snow and other bright or severe light conditions (14% VLT).

In some preferred embodiments, the lenses are noncorrective, while in other preferred embodiments, the lenses are single vision lenses that correct a single refractive need (e.g., myopia). However, the invention is also suitable for use with more complex lenses, such as bifocals, trifocals and progressive addition lenses.

D. Description of Figures

Figure 2:
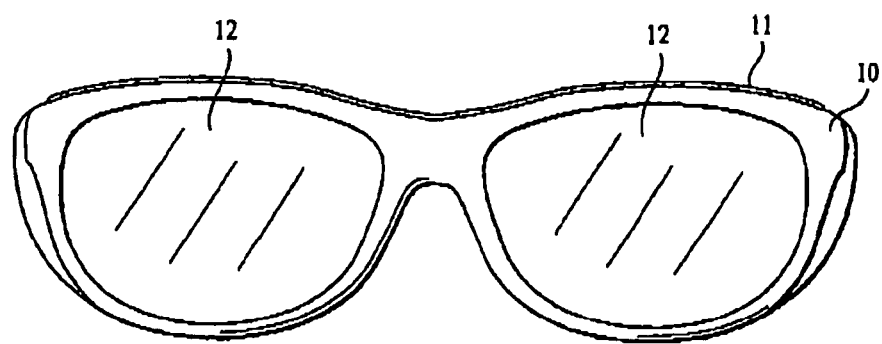
FIG. 2 is a front view of the eyewear frame and eyewear insert of FIG. 1.
Figure 3:
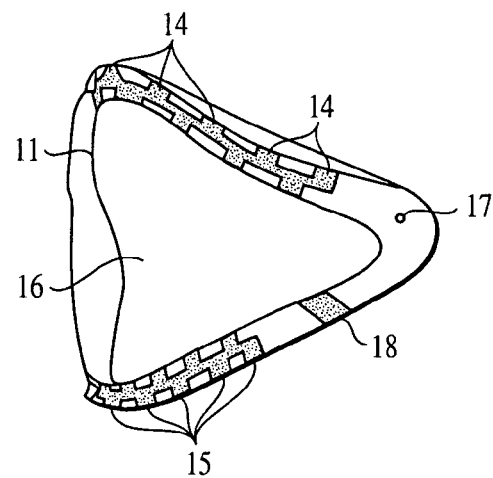
FIG. 3 is a side view of the eyewear insert of the previous figures.
Figure 4:
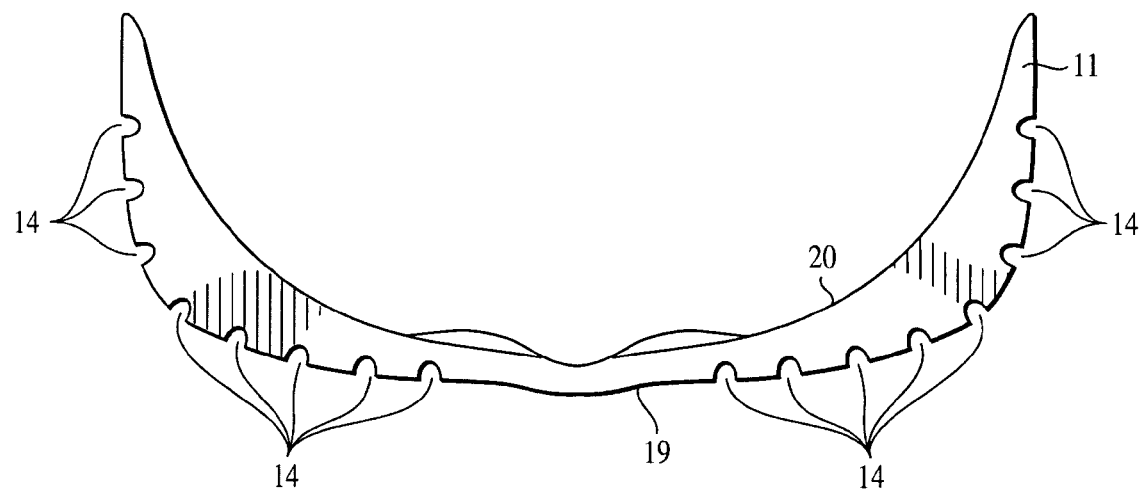
FIG. 4 is a top view of the eyewear insert of the previous figures.
Figure 5:
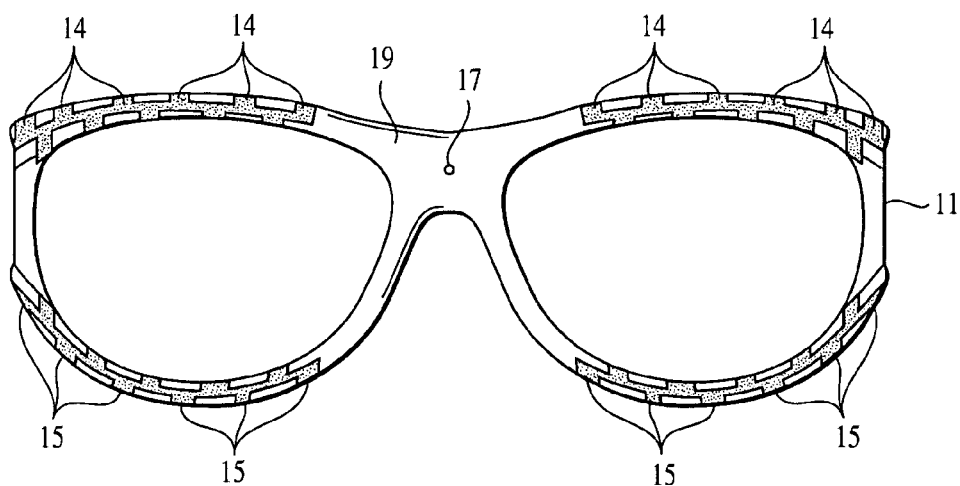
FIG. 5 is a front view of the eyewear insert of the previous figures.

Several views of an exemplary embodiment are provided in FIGS. 1–6. The present invention comprises an insert or inner liner 11 that can be attached to or co-molded to an eyewear frame 10 having temple bars 13 (FIG. 1). In preferred embodiments, the front surface of the inner liner comprises indirect baffled vents 14, and the back surface of the inner liner comprises a serrated pattern 26. In some embodiments, direct or indirect venting means are provided: within the inner liner, between the inner liner and the frame, or between a co-molded frame/inner liner and at least one lens 12 (FIG. 2). In some preferred embodiments, the venting means comprises a plurality of upper vents 14 and/or a plurality of lower vents 15 (FIG. 3). The insert 11 of the present invention protects a wearer's eyes from a variety of insults by providing at least one deadspace 16 between a wearer's face and at least one eyewear lens. In some embodiments, the insert comprises one or more screw holes 17 for releasable attachment to an eyewear frame. In additional embodiments, the venting means further comprises one or more venturi tunnels 18. As depicted in FIG. 4, the eyewear insert of the present invention comprises a front surface 19 that closely contacts the eyewear frame and a back surface 20 that substantially contacts the wearer's face (skin around the orbital area of the wearer's eyes). One embodiment of the present invention comprising a baffled venting means between an eyewear insert and an eyewear frame is provided in the view of the front surface 19 of a detached eyewear insert 11 in FIG. 5. For improved peripheral vision, some frames of the present invention comprise apertures for side lenses 23, as well as main lenses 12 (FIG. 6). For attachment to an eyewear frame, the temple bars of the eyewear frame may comprise a hole and a screw 22.

Figure 7:
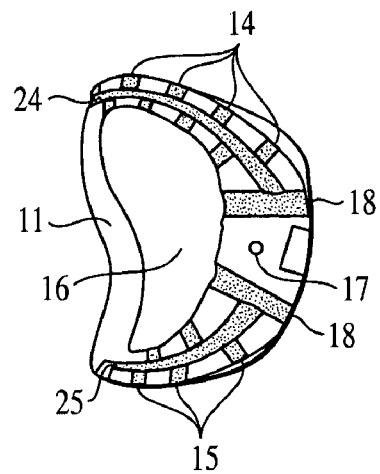
FIG. 7 is a side view of a second exemplary eyewear insert of the present invention.
Figure 8:
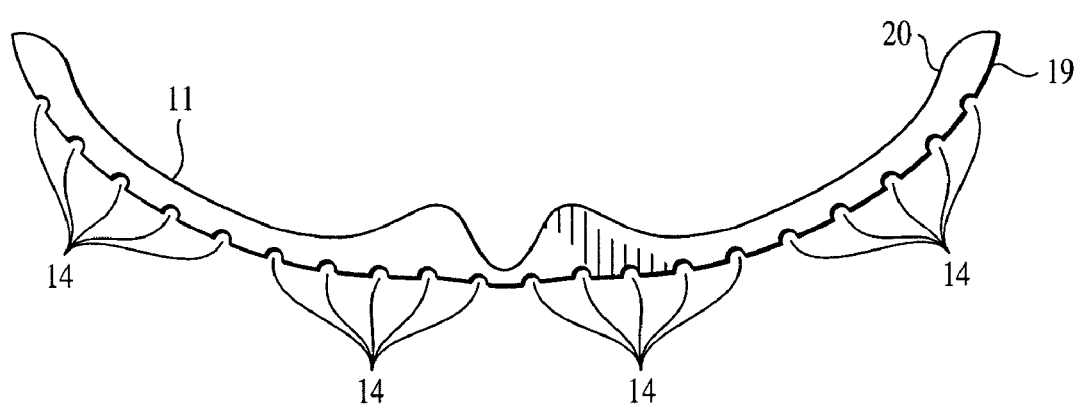
FIG. 8 is a top view of the eyewear insert of FIG. 7.
Figure 9:
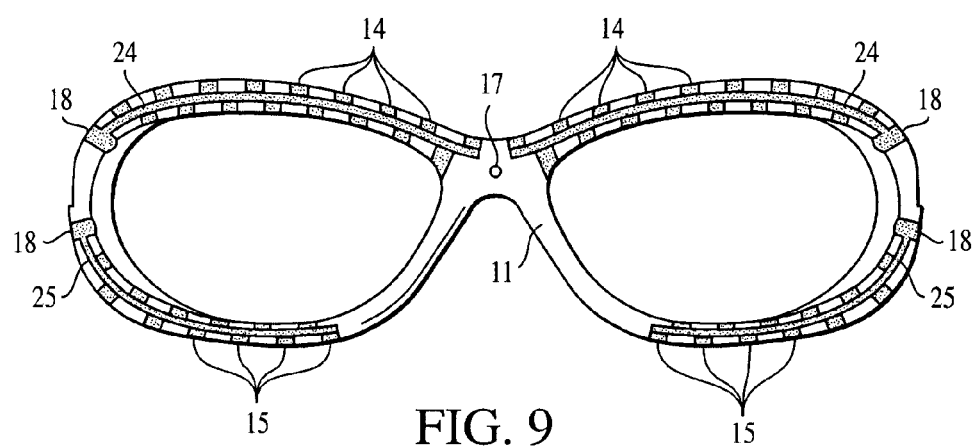
FIG. 9 is a front view of the eyewear insert of FIG. 8.
Figure 10:
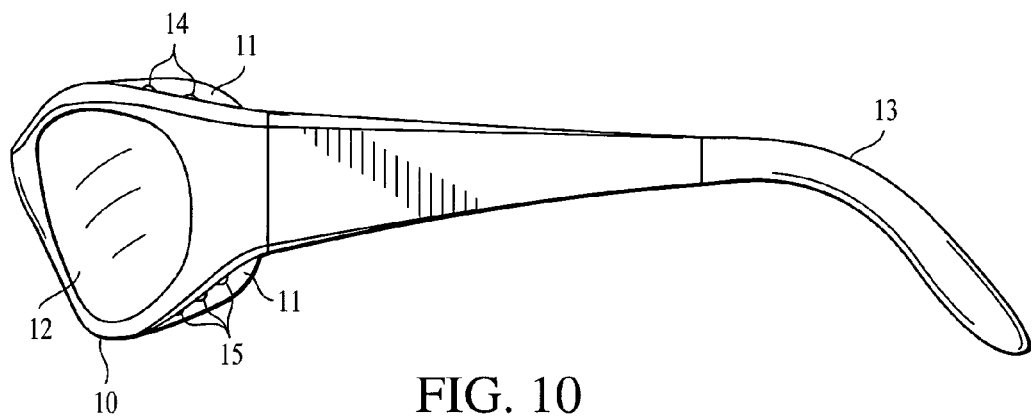
FIG. 10 is a side view of the eyewear frame and eyewear insert of FIG. 9.

A second exemplary embodiment is shown in FIGS. 7–10. The venting means of the eyewear insert 11 of this embodiment comprises upper vents 14 and lower vents 15, as well as multiple venturi tunnels 18, upper grooves 24 and lower grooves 25 (FIG. 7). The inner liner 11 depicted in FIGS. 8 and 9 is smaller and narrower than the previous exemplary inner liner, to accommodate a smaller frame 10 such as that shown in FIG. 10.

Figure 11:
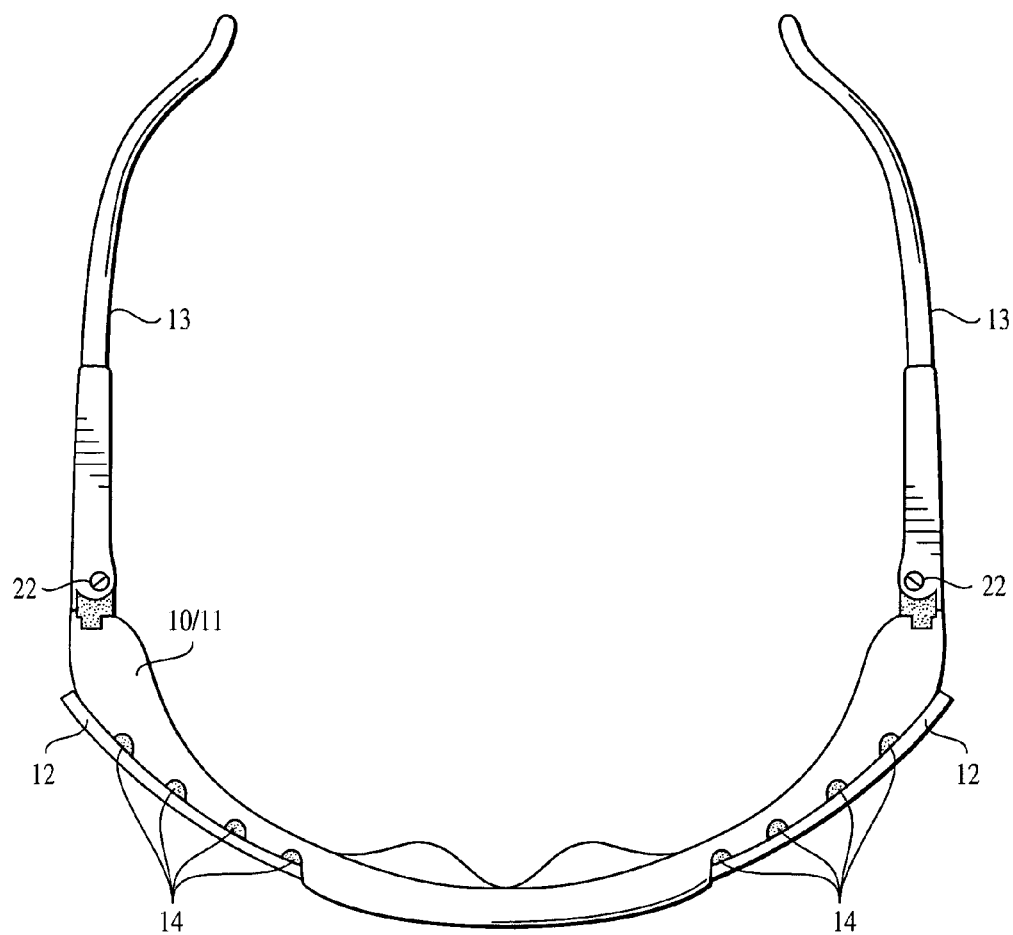
FIG. 11 is a top view of an additional embodiment of the present invention comprising an eyewear frame with co-molded insert and a lens.
Figure 12:
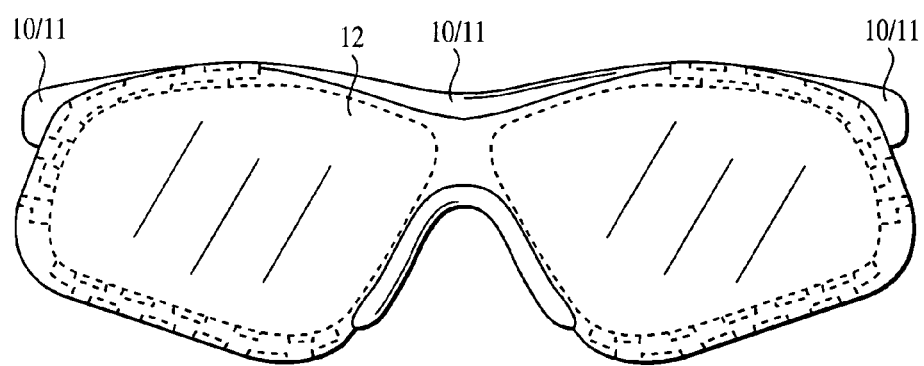
FIG. 12 is a front view of the protective eyewear of FIG. 11. The dotted lines depict the eyewear insert configuration covered by the lens.

In a third exemplary embodiment, the inner liner of the present invention is co-molded to the frame 10/11 (FIG. 11). In this embodiment, the venting means is located between the inner liner/frame combination and a single lens 12, which substantially covers or hides the inner liner/frame component 10/11. The venting means in this example, is a baffled venting means, whose outline is depicted by dotted lines beneath the lens of FIG. 12.

All patents mentioned in the above specification are herein incorporated by reference. Various modifications and variations of the described invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

We claim:

1. An eyewear insert for protecting a wearer's eyes, comprising: a flexible or semi-rigid anatomically-molded inner liner comprising a front surface that closely contacts an inner surface of an eyewear frame or lens, and a back surface that substantially contacts skin around a wearers eyes, so that one or more deadspaces are created between said eyewear frame or lens and said wearer's eyes, by substantially filling the gap between said eyewear frame or said lens and said skin around a wearer's eyes, wherein said front surface comprises indirect baffled vents for channeling airflow through said deadspaces, said back surface comprises a serrated pattern, said liner does not comprise face foam and wherein said inner liner is sized for attachment to an inner surface of an eyewear frame or co-molded as part of an eyewear frame.

2. The eyewear insert of claim 1, wherein said inner liner is made of a durable, flexible material for accommodating a plurality of face sizes.

3. The eyewear insert of claim 1, wherein said inner liner is made of a durable, semi-rigid material for accommodating a single face size.

4. The eyewear insert of claim 1, wherein said insert is retrofitted to an existing eyewear.

5. The eyewear insert of claim 1, wherein said insert is releasably attached to an eyewear frame by a means selected from the group consisting of screws, Velcro, clips, and temple slip.

6. The eyewear insert of claim 1, wherein said insert is permanently attached to an eyewear frame.

7. The eyewear insert of claim 1, wherein said insert is configured to fit within an eyewear frame comprising side windows.

8. The eyewear insert of claim 1, wherein said insert is configured to fit within an eyewear frame comprising prescription lenses of any thickness.

9. The eyewear insert of claim 1, wherein said baffled vents of said insert comprise staggered vent grooves for forcing incoming air to make a ninety degree turn before entering said deadspaces.

10. The eyewear insert of claim 1, wherein said vent comprises venturi tunnels.

11. The eyewear insert of claim 1, wherein said serrated pattern is configured for reducing sweating and discomfort.

12. The eyewear insert of claim 1, wherein said insert is made of thermoplastic rubber.

13. Protective eyewear comprising an eyewear frame having temple bars or a strap, and the eyewear insert of claim 1.

14. The protective eyewear of claim 13, wherein said eyewear frame and said insert are made of a durable, flexible material suitable for accommodating a plurality of face sizes by flattening the eyewear frame and insert, upon spreading said temple bars.

15. The protective eyewear of claim 13, wherein said eyewear frame is made of a plastic material.

16. The protective eyewear of claim 15, wherein said plastic material is GRILAMID.

17. The protective eyewear of claim 13, wherein said eyewear frame comprises a single aperture suitable for use with a single shield-like lens.

18. The protective eyewear of claim 13, wherein said eyewear frame comprises two apertures suitable for use with two lenses.

19. The protective eyewear of claim 13, wherein said eyewear frame comprises four apertures suitable for use with two main lenses and two side lenses.

20. The protective eyewear of claim 13, wherein said temple bars of said eyewear frame comprise a means for adjusting temple length.

21. The protective eyewear of claim 13, comprising a means for panascopic angle adjustment located between said temple bars and said eyewear frame, within said temple bars or within said eyewear frame.

22. Protective eyewear comprising at least one lens, an eyewear frame having temple bars or a strap, and an eyewear insert for protecting a wearer's eyes, comprising: a flexible or semi-rigid anatomically-molded inner liner comprising a front surface that closely contacts an inner surface of an eyewear frame or lens, and a back surface that substantially contacts skin around a wearers eyes, so that one or more deadspaces are created between said eyewear frame or lens and said wearer's eyes, by substantially filling the gap between said eyewear frame or said lens and said skin around a wearer's eyes, wherein said front surface comprises indirect baffled vents for channeling airflow through said deadspaces, said back surface comprises a serrated pattern, said liner does not comprise face foam and wherein said inner liner is sized for attachment to an inner surface of an eyewear frame or co-molded as part of an eyewear frame.

23. The protective eyewear of claim 22, wherein said at least one lens is polarized.

24. The protective eyewear of claim 22, wherein said at least one lens provides at least 95% protection from harmful UVA and UVB rays.

25. The protective eyewear of claim 22, wherein said at least one lens filters at least 95% of the harmful high-energy visible light.

26. The protective eyewear of claim 22, wherein said at least one lens transmits from 12% to 98% visible light.

27. The protective eyewear of claim 22, wherein said at least one lens is made of a plastic material.

28. The protective eyewear of claim 27, wherein said plastic material is selected from the group consisting of CR39, polycarbonate, polyurethane, and MELANITE.

29. The protective eyewear of claim 22, wherein said at least one lens is made of a glass.

30. The protective eyewear of claim 22, wherein said at least one lens is a prescription lens.

31. The protective eyewear of claim 22, wherein said at least one lens is a double-paned lens.

32. The protective eyewear of claim 22, wherein said at least one lens comprises an antifog means.

33. The protective eyewear of claim 22, wherein said at least one lens is interchangeable.

34. The protective eyewear of claim 22, wherein said eyewear frame is substantially hidden behind said at least one lens.

* * * * *